April 4, 1939.  H. DAGAVARIAN  2,152,877

MATRIX RETAINER

Filed Nov. 2, 1936

INVENTOR.
Hagop Dagavarian
BY Rasmussen & Brugman
ATTORNEYS.

Patented Apr. 4, 1939

2,152,877

UNITED STATES PATENT OFFICE 2,152,877

MATRIX RETAINER

Hagop Dagavarian, Chicago, Ill., assignor of one-half to Martin H. Chakoian, Chicago, Ill.

Application November 2, 1936, Serial No. 108,830

3 Claims. (Cl. 32—63)

This invention relates in general to dental matrix retainers, and more particularly to such retainers which are adapted to firmly hold either a Celluloid or metal matrix around a desired tooth.

A principal object of the invention is the provision of a dental matrix retainer which is equally well adapted for use with a tooth having a mesial cavity as with one having a distal cavity.

Another important object of the invention is the provision of a dental matrix retainer in which the matrix holding arms are pivotally mounted relative to their operating means to facilitate operation thereof in any desired position of use.

A further important object of the invention is the provision of such a retainer in which the band holding arms are curved to facilitate their use with a tooth having a mesial cavity.

Another important object of the invention is the provision of a dental matrix retainer which so engages the matrix band when drawing the same into place against the surface of the tooth as to obviate any possibility of tearing or otherwise injuring the band.

Numerous other objects and advantages of the invention will be apparent as it is better understood from the following description, which, when taken in connection with the accompanying drawing, discloses a preferred embodiment thereof.

Figure 1:
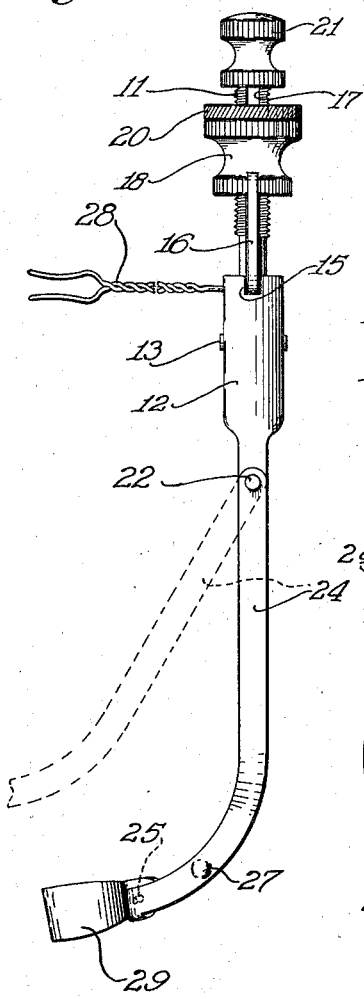
Figure 1 is an enlarged side elevational view of a matrix retainer embodying the features of the instant invention.

Referring more particularly to the drawing reference numeral 11 indicates a supporting screw to the lower end of which are pivotally mounted a pair of wing members 12 by means of a cross pin 13. A tension spring 14 is provided with a central coil which surrounds the pin 13, and the free ends of the spring engage against the lower inner surfaces of the wing members 12 to urge the lower ends thereof in an outward direction. The upper ends of the wing members 12 are provided with suitable vertically disposed slots or apertures 15 which are engaged by the lower ends of an actuating member 16. The actuating member 16 is mounted for sliding movement in a longitudinal slot or recess 17 in the supporting screw 11. Mounted upon the screw 11 above the actuating member 16 is an adjusting nut 18, the lower end of which engages within a suitable recess 19 in the upper end of the actuating member 16. A locking member or nut 20 is also mounted upon the screw 11, above the adjusting nut 18, which locks the adjusting nut 18 in any desired position. A suitable cap 21 may be mounted on the upper end of the supporting screw 11 to limit upward movement of the adjusting nut 18 thereon.

Figure 3:
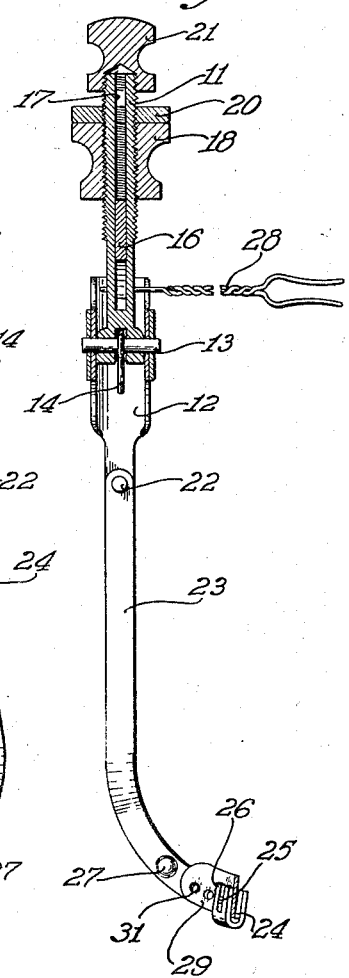
Fig. 3 is a sectional view taken substantially on the line 3—3 in Fig. 2.
Figure 4:
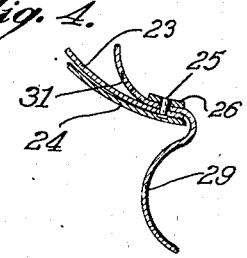
Fig. 4 is an enlarged detailed view of the matrix band retaining means.

The lower end of each of the wing members 12 is provided with a suitable pivot pin 22 upon which are pivotally mounted the upper ends of a pair of curved arm members 23 and 24. The lower end of each of the inner arms 23 is provided with an inwardly extending pin 25 which may be secured to the inner surface of said arm in any suitable manner. The lower end of each of the outer arms 24 has a small extension which is bent back upon itself and terminates in a bifurcated portion 26 which embraces the lower end of the inner arm 23 and extends slightly beyond the pin 25 (Figs. 3 and 4). Adjacent the lower end of the curved arm members 23 and 24 is a holding or fastening means 27, which may be in the form of a snap button or other suitable device. A suitable supporting spring clip 28 may be mounted on the supporting screw 11 adjacent its lower end for a purpose to be later described.

The above described device is adapted for use in retaining a matrix band, such as that indicated by reference numeral 29 (Fig. 5), in position surrounding a tooth having a cavity therein which it is desired to fill. The matrix band 29 shown in the drawing is curved with its lower edge having a greater curvature than its upper edge so that it will conform exactly to the shape of a tooth, and may be provided with a plurality of longitudinally spaced apertures or holes 31 adjacent each end.

Figure 2:
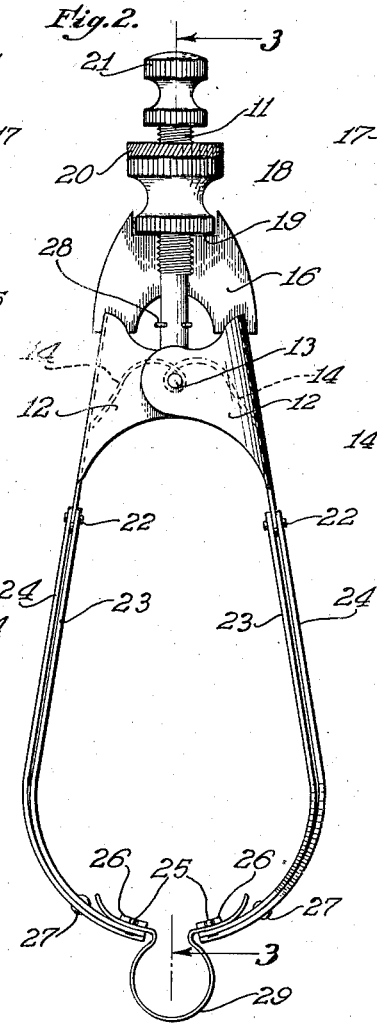
Fig. 2 is a front elevational view of the device of Fig. 1.

In the operation of the device, the matrix band 29 is positioned on the lower ends of the arms 23, 24, as shown in Fig. 2, with the pins 25 extending through selected ones of the apertures 31. The matrix band is then placed over the tooth which it is desired to fill and is drawn into place against the surface of the tooth by rotating the adjusting nut 18. Rotation of the nut 18 to move it downwardly relative to the supporting screw 11 will move the actuating member 16 against the wing members 12 to spread the upper ends thereof and swing the lower ends and the arms 23, 24 towards each other. In such tightening movement of the matrix band, the end surfaces of the arms 23, 24 engage against the outer surface of the matrix (Fig. 4) so that very little, if any, strain is transmitted to the matrix by the retaining pins 25. This effectively obviates the possibility of tearing of or other injury to the matrix 29. The lock nut 20 is then rotated against the adjusting nut 18 to securely hold the same in that position.

The positioning of the matrix 29 on the retaining device exteriorly of the ends thereof, as shown in Fig. 2, is employed when the tooth being treated has a distal cavity. When the cavity is mesial the matrix is positioned on the retaining device to form an inwardly disposed loop. It will therefore be readily apparent that the curvature of the arms 23, 24 and their pivotal mounting on the wing members 12 greatly facilitates the use of the device in conjunction with either a mesial or distal cavity, the broken line representation of the arms in Fig. 1 illustrating one position to which they may be moved relative to the actuating members.

By using the retaining pins 25 as above described, a Celluloid matrix may be employed which is not provided with any holes or apertures similar to the holes 31 in the matrix 29. Such a Celluloid matrix may be positioned on the retaining device to form the desired size of loop and the end portions thereof pressed against the retaining pins 25 to puncture the latter through the matrix. The snap fastener 27 will then hold the arm members 23 and 24 in close relation to each other and thus prevent the arms from becoming disengaged. When the retaining device is being used in conjunction with the upper teeth it may be desirable to employ the supporting clip 28 which may rest upon the lower teeth to maintain the actuating members out of the operator's way.

Figure 5:
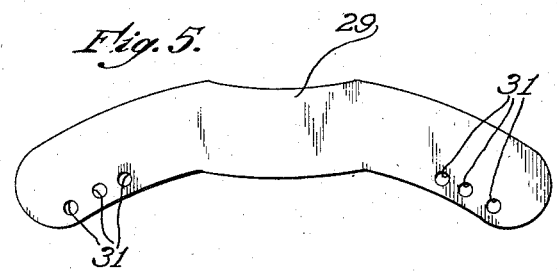
Fig. 5 is a plan view of one form of matrix band that may be used.

The particular shape of the matrix 29 shown in Fig. 5 materially reduces the probability of cutting of the gums by the matrix, because it more perfectly conforms to the contour of a tooth than those of the prior art.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a dental matrix retainer, a pair of matrix retaining members movable relative to each other, each of said members comprising a rounded end portion adapted to have surface contact with the matrix in the tightening of the same around a tooth, and a pin member disposed adjacent said end portion on the inner surface of one of said retaining members for impaling an end of said matrix.

2. In a dental matrix retainer, a pair of matrix retaining members movable relative to each other, each of said members comprising a rounded end portion adapted to have surface contact with the matrix in the tightening of the same around a tooth, a pin member disposed adjacent said end portion on the inner surface of one of said retaining members for impaling an end of said matrix, and a retaining clip secured to the other of said retaining members adjacent said end portions and having a bifurcated end adapted to engage the inner surface of the end of the matrix and the free end of said pin member.

3. A dental matrix retainer, comprising a supporting member, a pair of actuating members mounted on said supporting member for movement relative thereto, a pair of matrix retaining arms pivotally mounted on each of said actuating members for swinging movement in a plane substantially at right angles to the plane of movement of said actuating members relative thereto and to each other, said arms being curved adjacent their matrix retaining ends out of the plane of movement of said actuating members and provided with rounded end portions adapted to have surface contact with the matrix in the tightening of the same around a tooth, a pin member disposed adjacent said rounded end portions on the inner surface of the inner ones of each of said pairs of arms for impaling the ends of the matrix, and a clip member mounted on the outer ones of each of said pairs of arms and having a bifurcated end adapted to engage the inner surface of said matrix and the associated pin member.

HAGOP DAGAVARIAN.